United States Patent
Knee et al.

(10) Patent No.: US 8,442,318 B2
(45) Date of Patent: May 14, 2013

(54) METHOD AND APPARATUS FOR MODIFYING A MOVING IMAGE SEQUENCE

(75) Inventors: Michael James Knee, Petersfield (GB); David Brooks, Hants (GB); Roberta Piroddi, Havant (GB)

(73) Assignee: Snell Limited, Hampshire (GB)

( * ) Notice: Subject to any disclaimer, the term of this patent is extended or adjusted under 35 U.S.C. 154(b) by 1204 days.

(21) Appl. No.: 12/279,283

(22) PCT Filed: Feb. 13, 2007

(86) PCT No.: PCT/GB2007/000498
§ 371 (c)(1),
(2), (4) Date: Oct. 29, 2008

(87) PCT Pub. No.: WO2007/093780
PCT Pub. Date: Aug. 23, 2007

(65) Prior Publication Data
US 2009/0153730 A1     Jun. 18, 2009

(30) Foreign Application Priority Data

Feb. 13, 2006 (GB) ................................. 0602870.8
Nov. 27, 2006 (GB) ................................. 0623626.9

(51) Int. Cl.
*G06K 9/34* (2006.01)
*G06K 9/46* (2006.01)
*G06K 9/32* (2006.01)

(52) U.S. Cl.
USPC ........... 382/173; 382/203; 382/282; 382/286; 382/288; 382/295; 382/298; 382/103; 348/581; 348/240.2

(58) Field of Classification Search ................... 382/173, 382/203, 286, 288, 298, 282, 295, 103; 348/581; 348/208.6, 240.99, 240.2, 169
See application file for complete search history.

(56) References Cited

U.S. PATENT DOCUMENTS

| 5,187,574 A | 2/1993 | Kosemura et al. |
| 6,212,232 B1 | 4/2001 | Reed et al. |
| 8,115,821 B2 * | 2/2012 | Maki et al. ............... 348/222.1 |

(Continued)

FOREIGN PATENT DOCUMENTS

| EP | 1 096 799 | 5/2001 |
| WO | WO 00/00933 | 1/2000 |
| WO | WO 2004/025557 | 3/2004 |

OTHER PUBLICATIONS

Wang, Jun et al., "Video content representation on tiny devices" 2004 IEEE International Conference on Multimedia and Expo, vol. 3, Jun. 27, 2004, pp. 1711-1714.

(Continued)

*Primary Examiner* — Jon Chang
(74) *Attorney, Agent, or Firm* — Pearl Cohen Zedek Latzer, LLP

(57) ABSTRACT

A moving image sequence is automatically reframed for a small display. The framing is adjusted in dependence upon foreground and background segment weights derived for pixels in images in the sequence. Reframed images are formed from only those input pixels which fall within a reframing window within the input image area and the position or size of the reframing window is adjusted so as to maximize a weighted total of the sum of the foreground weights of pixels within the window and the sum of the background weights of pixels outside the window.

21 Claims, 13 Drawing Sheets

U.S. PATENT DOCUMENTS

| | | | |
|---|---|---|---|
| 2003/0035051 A1* | 2/2003 | Cho et al. ............... | 348/169 |
| 2004/0095477 A1 | 5/2004 | Maki et al. | |
| 2004/0105589 A1* | 6/2004 | Kawaharada et al. ....... | 382/236 |
| 2004/0148640 A1* | 7/2004 | Masukura et al. ............ | 725/135 |
| 2004/0189804 A1 | 9/2004 | Borden, IV et al. | |
| 2005/0151884 A1* | 7/2005 | Oh ............................... | 348/576 |
| 2005/0251015 A1 | 11/2005 | Takikawa et al. | |

OTHER PUBLICATIONS

Fan, Xin et al., "Looking into video frames on small displays", Proceedings of the ACM International Multimedia Conference and Exhibition, Nov. 8, 2003, pp. 247-250.

Cheng, Wen-Huang et al., "A visual attention based region-of-interest determination framework for video sequences" IEICE Transactions on Information and Systems, vol. E88-D, No. 7, Jul. 2005, pp. 1578-1586.

Chen, Li-Qun et al., "A visual attention model for adapting images on small displays", Multimedia Systems, 2003, pp. 1-12.

Zhou et al., "Video Object Segmentation and Tracking for Content-Based Video Coding", IEEE Conference on Multimedia and Expo, 2000, vol. 3, pp. 1555-1558. Jul. 30, 2000.

Zhang et al., "Moving Vehicles Segmentation based on Bayesian Framework for Gaussian Motion Model", Pattern Recognition Letters, vol. 27, No. 9, pp. 956-967, Jul. 2006.

Irani et al., "Computing Occluding and Transparent Motions", International Journal of Computer Vision, vol. 12, No. 1, pp. 5-16, Feb. 1994.

Meier et al., "Automatic Segmentation of Moving Objects for Video Object Plane Generation", IEEE Transactions on Circuits and Systems for Video Technology, vol. 8, No. 5, pp. 525-538, Sep. 1998.

Benzougar et al., "MRF-based Moving Object Detection from MPEG Coded Video", Proceedings 2001, IEEE International Conference on Image Processing, vol. 3, pp. 402-405, Oct. 2001.

Hill et al., "Optimal Search in Hough Parameter Hyperspace for Estimation of Complex Motion in Image Sequences", IEEE Proceedings: Vision, Image and Signal Processing, vol. 149, No. 2, pp. 63-71, Apr. 2002.

Lee et al., "Moving Object Segmentation Based on Statistical Motion Model", IEEE Electronics Letters, vol. 35, No. 20, pp. 1719-1720, Sep. 30, 1999.

Castagno et al., "Video Segmentation Based on Multiple Features for Interactive Multimedia Applications", IEEE Transactions on Circuits and Systems for Video Technology, vol. 8, No. 5, pp. 565-571. Sep. 1998.

Odobez et al., "Direct Incremental Model-Based Image Motion Segmentation for Video Analysis", Signal Processing, vol. 66, No. 2, pp. 143-155, Apr. 1998.

European Search Report for European Application No. EP 09 15 7009 dated Apr. 30, 2009.

Kim J et al: Multiple feature clustering for image sequence segmentation, Pattern Recognition Letters, Elsevier, Amsterdam, NL, vol. 22, No. 11, Sep. 1, 2001.

Scott S D: CSCE 970: Lecture 7: Clustering: Basic concepts, Internet Citation, 2001, Retrieved from the Internet: URL : http : /lcsce. unl . edu/{sscott/CscE970-sprOl,/s l l des,/7: c l uster-basic, pdf ,retrieved on Mar. 5, 2004.

Meyer F G et al: Region-Based Tracking Using Affine Motion Models in Long Image Sequences. CVGIP Image Understanding, Academic Press, Duluth, MA, US, vol. 60, No. 2, Sep. 1, 1994.

Ohm J-R et al: Feature-based cluster segmentation of image sequences, Image Processing, 1997. Proceedings., International Conference on Santa Barbara, CA USA Oct. 26-29, 1997, Los Alamitos, CA, USA, vol. 3.

Guo J et al: Fast and Accurate Moving Object Extraction Technique for MPEG-4 Object-based Video Coding, Proceedings of the SPIE, The International Society for Optical Engineering SPIE, USA, vol. 3653, No. 1/02, Jan. 1, 1998.

Mike Knee & Roberta Piroddi: Aspect Processing: The Shape of Things to Come, International Broadcasting Conference2008; Sep. 11-15, 2008; Amsterda.

Search Report for European Application No. 11177167.1 dated Nov. 14, 2011.

\* cited by examiner

METHOD AND APPARATUS FOR MODIFYING A MOVING IMAGE SEQUENCE

CROSS-REFERENCE TO RELATED APPLICATIONS

This application is a National Phase Application of PCT International Application No. PCT/GB2007/000498, International Filing Date Feb. 13, 2007, claiming priority of Great Britain Patent Applications No. 0602870.8, filed Feb. 13, 2006, and No. 0623626.9, filed Nov. 27, 2006, both of which are hereby incorporated by reference.

FIELD OF INVENTION

This invention concerns the modifying of a moving image sequence or video material, for example, to make it more suitable for viewing on small display devices, such as those incorporated in mobile telephones and other portable wireless devices.

BACKGROUND OF THE INVENTION

There is increasing interest in television broadcasting to portable devices. However the majority of film and television productions are intended for large displays; and the move to high definition television has encouraged the use of wide camera angles where the viewer tracks the action with his eyes rather than the camera tracking the action by pan, tilt, crab and zoom.

Where the display device is small it is usually necessary to limit the field of view to the most important part of the scene and, even then, key features of the action may be too small for the viewer to resolve them. This has led to a need to adapt video material for small displays. Such adaptation is possible by a human editor adjusting the settings of a digital video processor, but this is expensive and unsuitable for live production. There is therefore great interest in automating the processing of video material to make it more suitable for small-screen displays.

SUMMARY OF THE INVENTION

The invention consists, in one aspect, of a method and apparatus for automatically reframing a moving image sequence where the framing is adjusted in dependence upon foreground and background segment weights derived for pixels in images in the sequence.

Preferably, the reframed images are formed from only those input pixels which fall within a reframing window within the input image area and the position or size of the reframing window is adjusted so as to maximise a weighted total of the sum of the foreground weights of pixels within the window and the sum of the background weights of pixels outside the window.

The invention consists, in another aspect, in a method and apparatus for spatially segmenting a moving image sequence to determine respective foreground and background weights for image pixels, wherein previously assigned pixel weights are refined in dependence on: foreground and background motion models; and, foreground and background distance measures between pixels and respective foreground and background spatial centroid positions.

The invention consists, in another aspect, in a method and apparatus for automatically reframing a moving image sequence so as to move an area of interest towards a specified position in the image where the spatial centroid of a foreground segment is identified and the image is shifted in the direction which minimises the distance between the said foreground centroid and the said specified position.

The invention consists, in another aspect, in a method and apparatus for automatically reframing a moving image sequence by enlarging one or more images in the sequence by a zoom factor which varies in dependence upon a measure of the spatial extent of a foreground segment.

The invention consists, in another aspect, in a method and apparatus for automatically reframing a moving image sequence by enlarging one or more images in the sequence by a zoom factor where the said enlargement is centred upon a position in the image which depends upon a weighted measure of the position of foreground pixels in the image.

The invention consists, in another aspect, in a method and apparatus for automatically modifying a moving image sequence to make it more suitable for viewing on a small display device, comprising the steps of segmenting an image into foreground and background regions, with no predetermined constraint on the shape of the foreground region; and fitting a rectangular frame to the segmented image so as maximise the amount of foreground contained within the frame whilst minimising the amount of background contained within the frame, with no predetermined constraint on the size of the rectangular frame.

Preferably, the step of segmenting the image into foreground and background regions comprises the step of assigning to each pixel or picture block a foreground weight and a background weight representing the estimated probability that the pixel or picture block forms part of foreground and background respectively; and wherein the step of fitting a rectangular frame to the segmented image serves to as maximise the aggregate foreground weight whilst minimising the aggregate background weight of pixels or picture blocks contained within the frame.

The invention consists, in another aspect, in a method and apparatus for re-framing a picture comprising the steps of: determining a region of interest in a picture; and re-sizing the selected region of interest.

Preferably, the region of interest is determined based on the steps of measuring motion; establishing a motion pattern of the measured motion; determining the region of interest dependent on the established motion pattern.

The invention consists, in another aspect, in a method and apparatus for automatically modifying a moving image sequence to make it more suitable for viewing on a small display device comprising the steps of: optionally increasing the apparent size of portrayed features in dependence on calorimetric parameters of the said features; dynamically identifying a spatial area of interest within the image sequence; optionally dynamically enlarging the image; dynamically shifting the image so that the said area of interest is moved towards the centre of the image area; spatially, temporally or spatio-temporally filtering pixels outside the said area of interest; and, motion compensated reduction in the number of pixels and temporal sampling rate.

The invention consists, in another aspect, in a method and apparatus for automatically reframing a moving image sequence by enlarging one or more images in the sequence by a zoom factor wherein the zoom factor depends on a weighted summation of a distance measure between the positions of foreground pixels and the position of the foreground centroid and the image is increasingly enlarged as the weighted summation reduces.

The invention consists, in another aspect, in a method and apparatus for automatically reframing a moving image sequence by enlarging one or more images in the sequence by a zoom factor wherein the zoom factor depends on a measure of the speed of motion of background pixels and the image is increasingly enlarged as speed of motion decreases.

The invention consists, in another aspect, in a method and apparatus for automatically reframing a moving image sequence by enlarging one or more images in the sequence by a zoom factor wherein the zoom factor depends on a combination of a measure of the spatial extent of a foreground segment and a measure of the motion of a background segment.

The invention consists, in another aspect, in a method and apparatus for enhancing the visibility of critical image features on a small-screen display comprising the steps of: evaluating a pixel calorimetric difference parameter representative of the difference between the colour of a pixel and a reference colour; and, using the said calorimetric difference parameter to choose whether or not to modify the said pixel in dependence upon adjacent pixels.

BRIEF DESCRIPTION OF THE DRAWINGS

The invention will now be described by way of example with reference to the drawings in which.

DETAILED DESCRIPTION OF THE INVENTION

Figure 1:
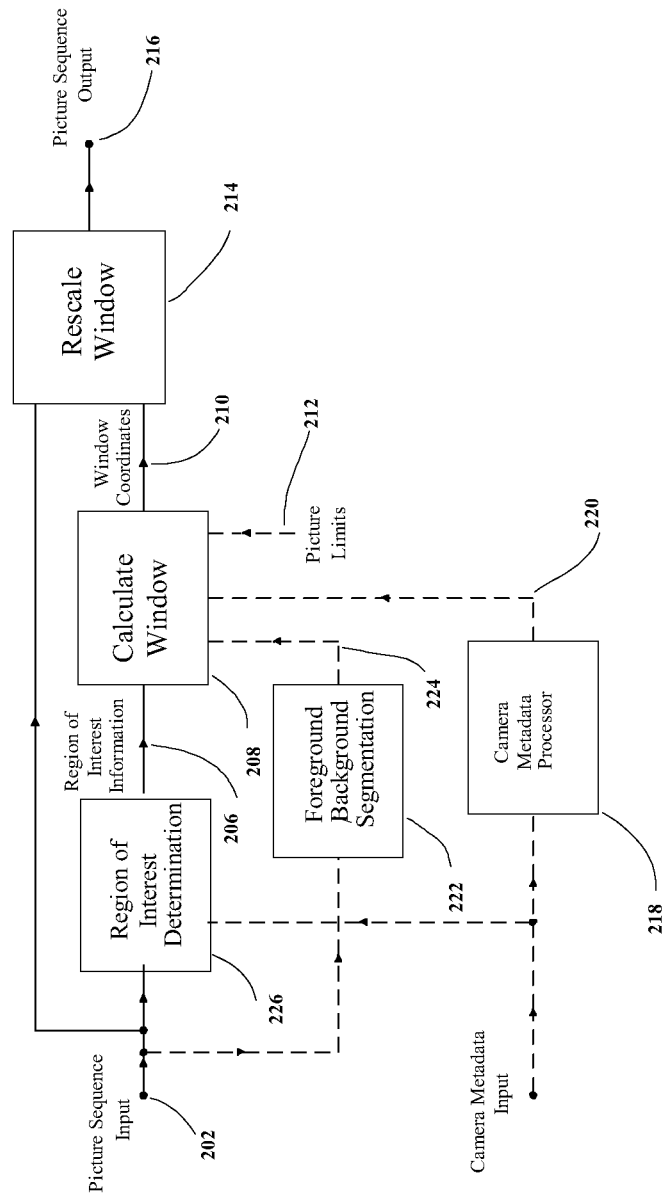
FIG. 1 shows a block diagram illustrating adaptive re-framing

Generally, it is envisaged that the present invention will be implemented to facilitate the transmission of content, such as live sports programs, to small-screen devices such as mobile phones and PDAs, and the invention will now be described in this context. However, it will be apparent that the invention can also be applied to other situations, and so the invention is not intended to be limited to this application.

An exemplary embodiment of the invention will now be described with reference to FIG. 1, which shows a block diagram illustrating adaptive re-framing in accordance with an embodiment.

The input picture sequence 202 is applied to a region of interest determination block 226, which will in a preferred example take the form of a motion analysis block which measures and analyses the motion present in the picture.

As will be known to a skilled person there are many known techniques, such as block-matching or phase correlation, for measuring motion in areas of a picture that is part of a moving picture sequence. Typically a number of motion vectors forming a motion vector field will be established, where the motion vectors represent the direction and magnitude of motion in areas of the picture. Motion vectors may be calculated for each pixel of the picture, but more commonly will be calculated for a group of pixels, such as a block of pixels.

Once motion in the picture has been established, the motion is analysed in order to determine a region of interest. Many picture sequences and in particular pictures of sporting events will contain a single object of interest in the foreground moving across a background. Examples of such a picture sequence would be a picture sequence tracking a show-jumping horse, or a single or group of racing horses or cars or people, for example.

Analysis of the measured motion pattern of a picture in such a picture sequence would be expected to show stationary or substantially uniform motion (if the camera is panning) of the background and a different generally uniform motion of the foreground (for example for racing cars) or a different more complicated motion pattern of the foreground (for example for racing horses or people). Thus an analysis of the motion pattern within a picture can be used to identify a region of interest including the foreground and to generate region of interest information 206.

Region of interest information may in principle be represented in any fashion and may describe a region of interest of any shape. However, in general it is expected that the region of interest information will describe a rectangular region of interest.

In some embodiments the region of interest information 206 may be temporally smoothed and advanced in time relative to the picture. Picture-by-picture variations in the shape or size of the region of interest can thus be smoothed, enabling an effective simulation of a camera that pans and zooms smoothly. If the region of information is temporally advanced slightly the region of interest will track slightly in advance of the action, simulating the action of a skilled camera operator.

Region of interest information 206 generated by the motion analysis block 226 is passed from the motion analysis block 226 to a window calculation block 208, which can then calculate co-ordinates 210 of the desired window to be selected from the input picture. The window calculation block 208 may also be supplied with picture limit information 212 to ensure that the re-framed window remains within the original picture and/or conforms to the size or aspect ratio of the required output picture.

The window co-ordinates 210 calculated by the window calculation block 208 are supplied to the re-scale window block 214. The re-scale window block 214 is also supplied with the input picture 202. The re-scale window block 214 selects the portion of the picture identified by the window co-ordinates 210, re-sizes as necessary, and supplies an output picture 216.

Typically the output picture 216 may be compression coded, for example MPEG2 compression coding and then formatted for transmission to a small screen device such as a mobile phone or PDA.

Alternative embodiments may also include additional information to define a region of interest and/or to calculate the window co-ordinates as shown in dotted lines in FIG. 1. In particular, in some embodiments, camera metadata, such as information relating to the pan and/or tilt and/or zoom and/or movement of the camera, for example, which provide a priori motion knowledge, may be used by the motion analysis block 226 in determining region of interest information. Additionally or alternatively camera metadata may be supplied to a camera metadata processor 218 to generate region of interest information 220 to be input to the window calculation block 208. Additionally or alternatively in some embodiments foreground/background segmentation information may be used in segmentation block 222 to generate additional region of interest information 224 for supply to the window calculation block 208.

If the window calculation block 208 receives a region of interest information from more than one source (for example region of interest information 206, 220, 224) the window calculation block 208 may based the determined window co-ordinates 210 based on any combination of the received region of interest information.

It should be noted that the region of interest information, whether derived from the motion analysis block, segmentation block 222 or camera metadata processor 218, may in some embodiments be information that provides a measure of the confidence or a probability measure for the inclusion of each pixel or region of pixels in the region of interest.

The motion analysis carried out by motion analysis block 226 of FIG. 1 is only one method of determining a region of interest.

In one alternative embodiment the region of interest determination is based on establishing a definition of the region of interest for at least one picture in a sequence of pictures. The region of interest information for each subsequent picture in the sequence can be derived by spatial and/or temporal interpolation of the region of interest defined for a preceding picture. If interpolation is used to define the region of interest, preferably information from pictures both before and after the current picture in the sequence may be used. Although the use of information from pictures after the current picture in the sequence requires pictures to be re-ordered and introduces delay, the resulting interpolation is likely to be more reliable.

The definition of the region of interest in a picture, which then serves as the basis for interpolation of the region of interest in subsequent pictures, may be established in a number of ways. In one embodiment the region of interest may be defined by human intervention. In other embodiments automatic or semi-automatic techniques may be used. In particular, segmentation techniques such as foreground/background segmentation techniques may be used to define a region of interest.

The definition of the region of interest in a picture may be established twice in each picture sequence, for example before and after every shot change, or may be established periodically, for example every n frames.

Alternatively segmentation techniques may be used in every picture to define a region of interest therein.

Figure 2:
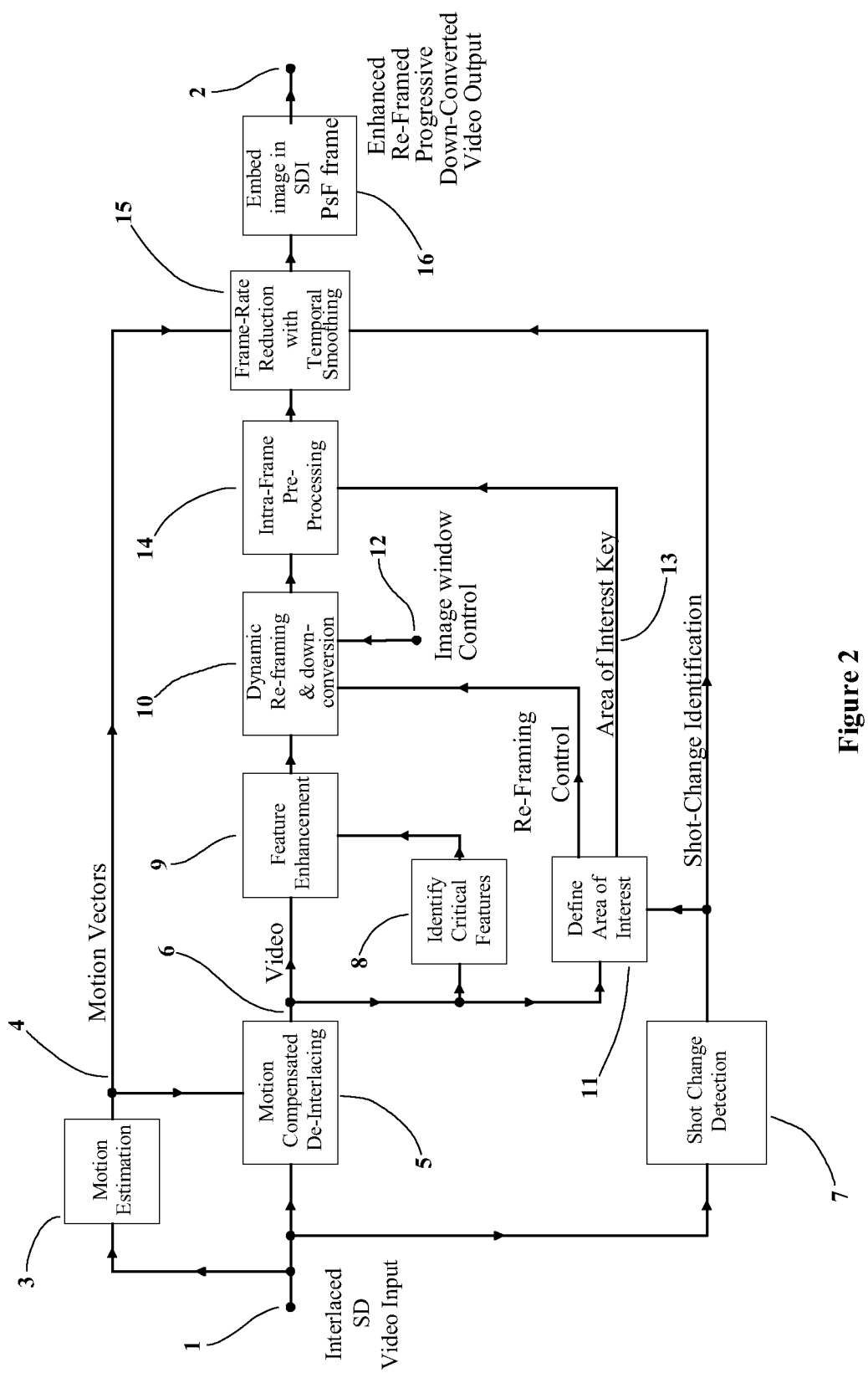
FIG. 2 shows a block diagram of a video processing system according to the invention.

Reference is now directed to FIG. 2.

In FIG. 2 an input video signal (1) is processed to form an output video signal (2) which has been enhanced and re-framed to make it more suitable for small-screen display. In the description which follows it is assumed that the signal (1) is an interlaced, standard-definition television signal, and the output video signal (2) is a small image occupying part of a progressively-scanned, segmented-frame raster. However the skilled person will appreciate that the invention is applicable to other input and output formats.

The input video signal (1) is passed to a motion estimator (3) which compares successive fields in known manner (for example by phase-correlation or block-matching) to derive motion vectors (4) describing the changes in position of image features over time. The motion vectors (4) are input to a motion-compensated de-interlacer (5) which converts, using known motion-compensated vertical-temporal interpolation methods, the interlaced input (1) to a progressive video signal (6). The input video (1) is also fed to a shot-change detector (7) which identifies points in the sequence of input fields where dissimilar images succeed each other. The shot-change detector (7) can use known techniques such as taking the difference between successive fields after vertically aligning them, or comparing histograms of luminance values.

The progressive video signal (6) is input to a critical-feature identification block (8) which identifies pixels relating to important image features, such as balls and lines in sport material, which need to be emphasised on small displays so that the viewer can better appreciate the image. Such features are enhanced by a feature-enhancement block (9) which is controlled by the critical-feature identification block (8). The operation of blocks (8) and (9) will be described below.

The feature-enhanced video output from the block (9) is passed to a dynamic reframing and down-conversion block (10) which reduces the number of pixels in the image to a number suitable for subsequent compression and transmission to small-screen displays. The image is also dynamically expanded and reframed in the block (10) under the control of an area of interest definition block (11). When the picture is expanded, information at the edges of the picture will be lost as some pixels will be moved out of the frame; however the re-framing process moves the image so that an area of interest is retained within the output image. The block (10) can use any of the known techniques of digital video effects production including variable decimation using FIR filters.

The re-framing and down-conversion block (10) receives a control input (12) which contains information defining parts of the picture which must always be included in the re-formatted output, such as channel identification logos or scoreboard graphics and the information from the control input (12) is used to modify the image expansion and movement control signals from the area of interest definition block (11).

The area-of-interest block (11) also provides an area-of-interest key signal (13) which identifies the region of the image which contains the most relevant action; this will usually be a sub-region of the area of the re-formatted picture and its shape will be related to the image content rather than the (usually rectangular) shape of the re-formatted picture. The operation of the block (11) will be described below.

The re-framed picture from the block (10) is passed to a pre-processing filter block (14) which applies spatial, temporal or spatio-temporal low-pass filtering to those parts of the image which are outside the area-of-interest defined by the signal (13). This low pass filtering of less-relevant parts of the picture can allow more information capacity to be allocated to the more-relevant areas in subsequent compressed transmission.

The pre-processed picture from the block (14) is passed to a frame-rate reduction and temporal smoothing block (15), which temporally down-samples the signal to a rate which is compatible with the transmission to, and display by, the intended small-screen display devices. This block can use known techniques of video frame-rate conversion including interpolation with FIR filters, which can, optionally be motion compensated using motion vectors from the block (3). The frame-rate reduction block (15) also receives shot change information from the block (7) which is used to avoid the combination of unrelated frames in the interpolation of reduced-rate frames.

The frame-rate reduced video from the block (15) is formatted for subsequent compression coding in an output formatting block (16). This packages the pixels of the video in a suitable way for coding and compression, for example by embedding them in part of a standard-definition, segmented-frame raster output according to the well-known serial digital interface described in ITU-R Recommendation 656.

The area-of-interest signal (13) is derived in the block (11) by an image segmentation process which is a novel development of the method described in international patent application WO 2004/05557. In the method of the latter patent pixels are assigned to respective image segments on the basis of a "Mahalanobis distance measure" which gives a measure of the proximity, in a multi-dimensional space of pixel attributes, of each pixel to the position of the "centroid" of each segment in the multi-dimensional space. The Mahalanobis distance measure scales the dimensions of the pixel attribute space in dependence on the covariance matrix of the individual distances in each dimension of the space. This makes it possible to combine information derived in the separate and unrelated dimensions of the space in a consistent and meaningful way.

In examples of the present invention' chrominance and colour component values are not used at all. However, the pixel luminance values from consecutive images may be used to construct an affine (six-parameter linear) model of the motion of each segment.

In preferred examples of the present invention:
The number of image segments is constrained to two: a "foreground" segment, which is the area of interest; and, a "background" segment which is the remainder of the image area.
The number of dimensions of the space of pixel attributes is two: the horizontal and vertical Cartesian co-ordinates of the pixel.
Motion-compensated inter-image luminance differences (derived from the segment motion models) may contribute to the segmentation.
Segments comprising large numbers of pixels may be favoured.
Segments of small extent may be favoured.
The segmentation may be made on a probabilistic basis so that the process assigns a value to each image pixel which is unity if there is complete certainty that the pixel is part of the foreground segment, and zero if there is complete certainty that the pixel is part of the background segment; fractional values are assigned where there is less than complete certainty.
The affine motion model for each segment comprises the coefficients ($a_0 \ldots a_5$) of the following pair of equations:

$$V_x = a_0 + a_1 x + a_2 y$$

$$V_y = a_3 + a_4 x + a_5 y \quad \text{(i)}$$

Where: $V_x$ and $V_y$ are the horizontal and vertical components respectively of the motion vector applicable to the pixel having Cartesian co-ordinates (x, y).

The two models (for the foreground and background segments) are created by refining respective initial models (which, for example, may have all zero coefficients) in dependence upon pixel value gradients weighted according to an existing segmentation of the picture. Measured motion vectors (such as those from the block (3) of FIG. 2) are not used.

The method of refining the motion models is based on that are given in the paper "Optimal search in Hough parameter hyperspace for estimation of complex motion in image sequences" by L. Hill and T. Vlachos and published in IEE Proceedings—Vis. Image Signal Process 149 No. 2 Apr. 2002 the full contents of which paper are incorporated by reference herein. This paper describes the use of various motion models (including that described above but also including models with other than six parameters) and these (or other gradient-based parametric motion models) can be used in the present invention.

Figure 3:
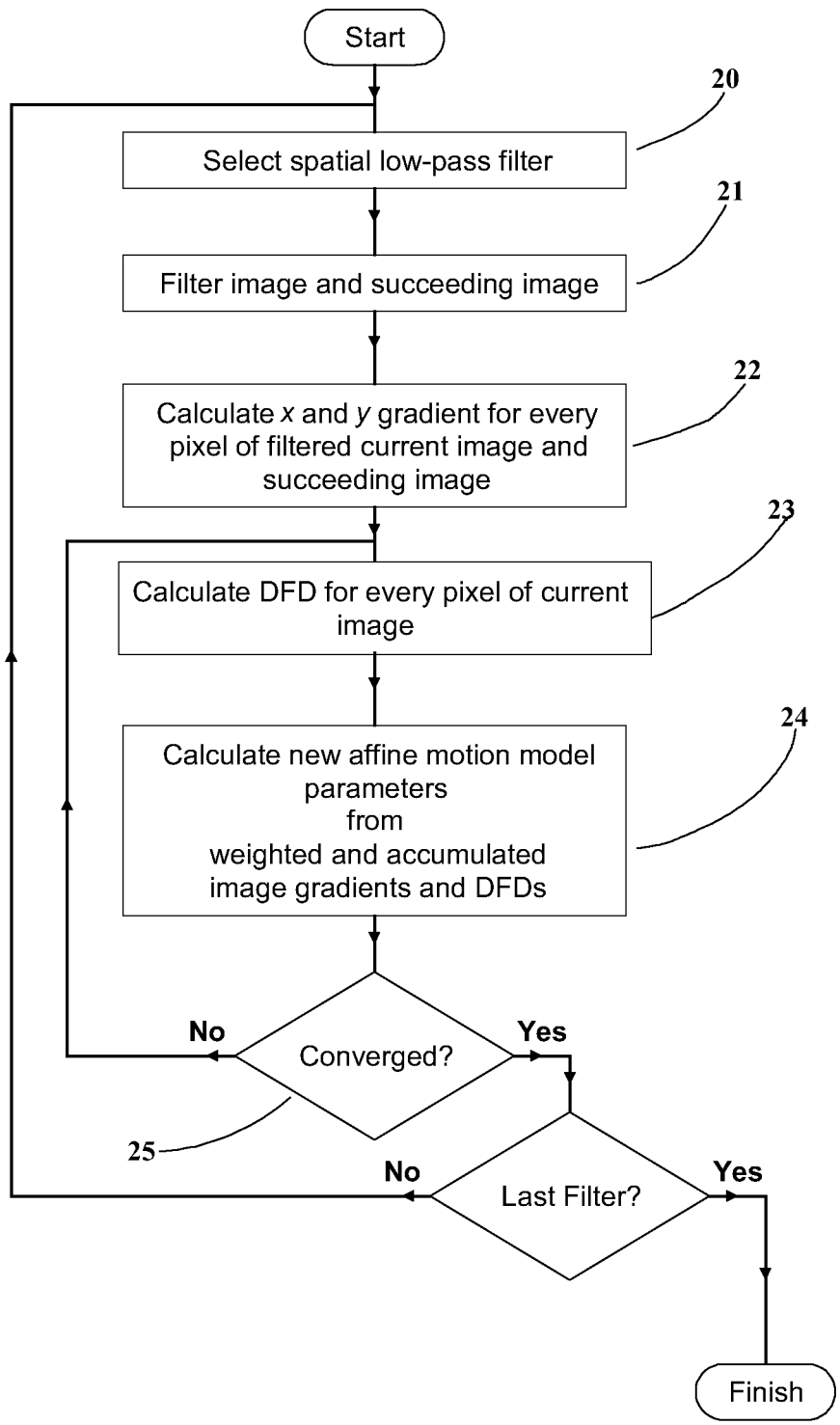
FIG. 3 shows a flowchart for refining a motion model for an image segment.

The flow chart of FIG. 3 shows a suitable implementation in which an iterative process of motion-model refinement is itself iterated on images of increasing resolution.

Referring to FIG. 3, the most stringent of a set of spatial low-pass filters is selected in step (20) and the image to be processed, and its successor in the sequence of images, are filtered in step (21). The horizontal and vertical luminance gradient is then evaluated at every pixel of both filtered images in step (22). The current motion model parameters are then used to generate a motion vector for every pixel of the current image and these vectors are used to calculate a displaced-frame difference (DFD) for each pixel in step (23). The DFD is the magnitude of the luminance difference between the (filtered) pixel and the luminance at the equivalent position in the succeeding (filtered) image shifted by the motion vector. (As the video has been de-interlaced, consecutive pictures are frames.)

In step (24) the image gradients and DFD values are used to refine the parameters of the affine motion model using the method described in the above-referenced paper. However, when the DFD and gradient values are summed over the image, both summations are weighted so that contributions from a pixel are scaled by the previously-determined probability of membership of the relevant segment for that pixel.

In step (25) the convergence of refinement process is tested by comparing the weighted DFD sum for the whole image with the sum obtained at the previous iteration; if a significant reduction is seen, the process returns to step (23) and the DFDs are re-calculated with the new motion model. If satisfactory convergence is then found in step (25) (i.e. if a weighted DFD sum similar to that from the previous iteration is found) the process returns to step (20) and the next least stringent spatial filter is selected and the process repeated. The process ends once all the filters have been used; and the motion model parameters are then stored for use.

The segmentation process makes use of spatially-filtered DFDs and DFD variances calculated from segment motion model parameters. This calculation is shown in the flow-chart of FIG. 4. For each pixel of each segment the respective motion model is used to find filtered DFDs between the luminance value of the pixel and the luminance value at an equivalent position in the succeeding image. A spatially-filtered DFD magnitude is determined for each pixel; and a weighted DFD-variance value is calculated for each segment.

Figure 4:
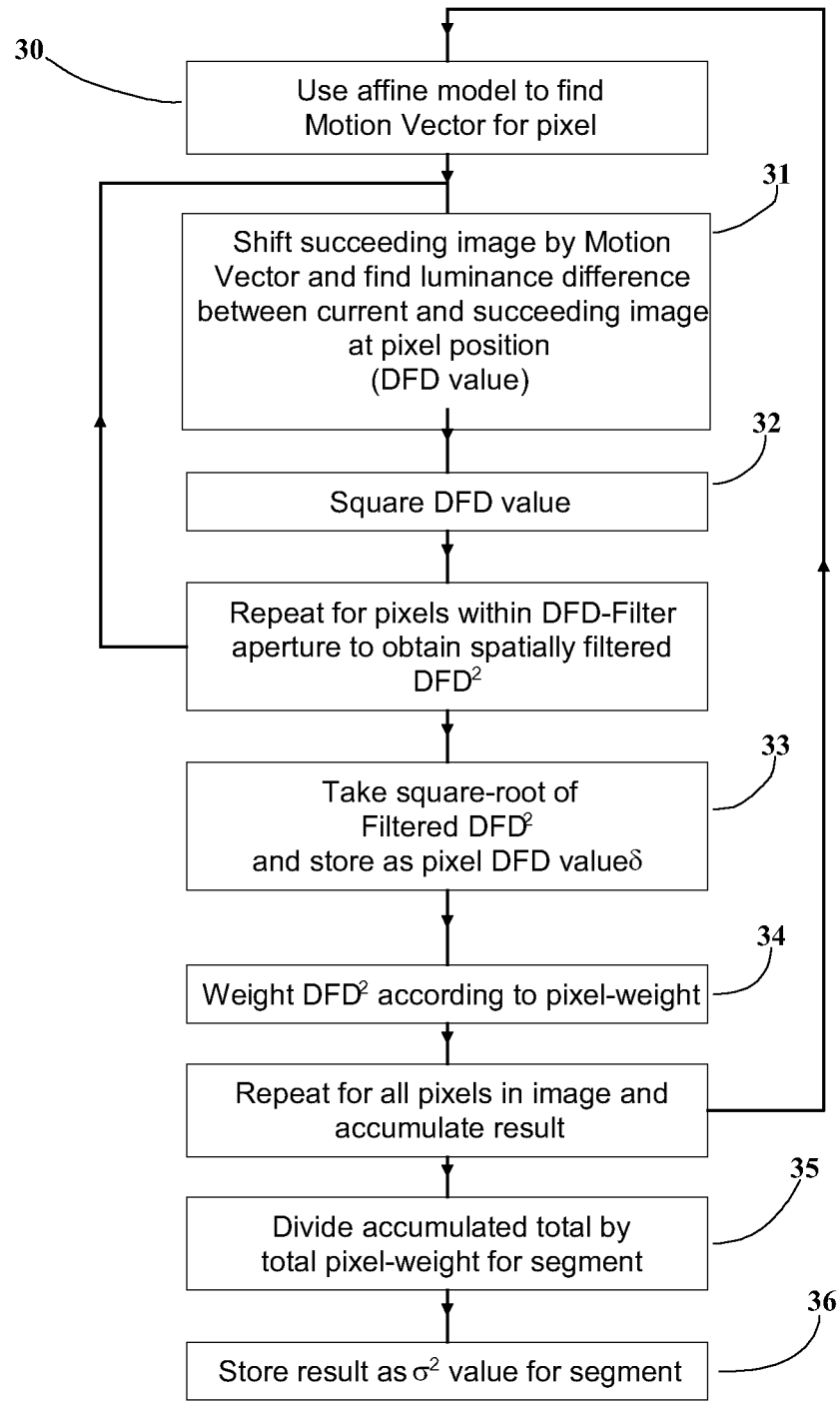
FIG. 4 shows a flowchart for calculating pixel displaced-frame differences and their variance.

Referring to FIG. 4 the motion vector for the first pixel of the current image is calculated from the affine motion model for the segment being processed in step (30). In step (31) this vector is used to shift the pixels of the succeeding image, and the luminance difference between the current pixel and the equivalent shifted pixel of the succeeding image is evaluated. This value is squared in step (32).

Steps (31) and (32) are repeated for a number of pixels forming a filter aperture centred on the location of the pixel being processed. A suitable filter aperture is a square array of 25 pixels in total. The results are accumulated after weighting according to suitable filter coefficients. In step (33) the square-root of the filter output is taken and stored as the DFD value for the current pixel and segment. This value will be denoted by δ.

In step (34) the squared DFD value is weighted according to the previously-determined segment membership of the current pixel. The weighting factor will be between zero and unity, with unity corresponding to certainty that the pixel is a member of the segment being evaluated.

Steps (30) to (34) are then repeated and the results accumulated for all the remaining pixels of the image. In step (35) the accumulated result is divided by the total contribution weights, for membership of the segment being processed, of all the pixels of the image. (If fractional membership were not permitted, this divisor would be the number of pixels in the segment.) The result of the division is stored, at step (36), as a measure of the DFD variance for the segment, denoted by $\sigma^2$.

The derivation of the pixel segmentation from the filtered DFD values, segment variance values and the motion model will now be described in detail.

The segmentation process makes use of a Mahalanobis distance measure between each pixel and the (previously determined) centroid of each segment. As mentioned previously, a probabilistic weighting factor is used to represent the segment membership of each pixel. The horizontal and vertical co-ordinates of the centroid for a segment are defined as follows:

$$\mu_x = \Sigma(w_i \cdot x_i) \div \Sigma(w_i)$$

$$\mu_y = \Sigma(w_i \cdot y_i) \div \Sigma(w_i)$$

Where
  $\mu_x$ is the horizontal co-ordinate of the segment centroid;
  $\mu_y$ is the vertical co-ordinate of the segment centroid;
  $w_i$ is the membership weighting factor for pixel i;
  $x_i$ is the horizontal co-ordinate of pixel i;
  $y_i$ is the vertical co-ordinate of pixel i; and,
  the summations are performed over all pixels of the image.

If the centroid is regarded as the "centre of mass" for the segment, the term $\Sigma(w_i)$ can be regarded as the "mass" of the segment and will be denoted as $M_s$, with the subscript identifying the segment.

The horizontal and vertical components of the distance between a pixel and a segment centroid are then:

$$(x_i - \mu_x)$$

$$(y_i - \mu_y)$$

The Mahalanobis distance measure for a segment makes use of the covariance matrix of the set of pixel-to-centroid distances; this is a 2 by 2 matrix having the following elements:

$$\{\Sigma w_i \cdot (x_i - \mu_x)^2\} \div M_s \quad \{\Sigma w_i \cdot (y_i - \mu_y) \cdot (x_i - \mu_x)\} \div M_s$$

$$\{\Sigma w_i \cdot (x_i - \mu_x) \cdot (y_i - \mu_y)\} \div M_s \quad \{\Sigma w_i \cdot (y_i - \mu_y)^2\} \div M_s$$

Where the summation is performed over all the pixels of the image.

This covariance matrix will be denoted by $\Lambda_s$ where the subscript$_s$ identifies the relevant segment.

In an example of the invention an "augmented" pixel-to-centroid distance is used which includes the pixel DFD value for the segment $\delta$. The elements of this distance are:

$$(x_i - \mu_x)$$

$$(y_i - \mu_y)$$

$$\delta$$

This will be will be denoted by (the matrix) $D_i$.

The covariance matrix is also augmented to become a 3 by 3 matrix with the following elements:

$$(1/M_s) \cdot \{\Sigma w_i \cdot (x_i - \mu_x)^2\} \quad (1/M_s) \cdot \{\Sigma w_i \cdot (y_i - \mu_y) \cdot (x_i - \mu_x)\} \quad 0$$

$$(1/M_s) \cdot \{\Sigma w_i \cdot (x_i - \mu_x) \cdot (y_i - \mu_y)\} \div M_s (1/M_s) \cdot \{\Sigma w_i \cdot (y_i - \mu_y)^2\} \quad 0$$

$$0 \quad 0 \quad \sigma^2$$

This matrix will be denoted by $\Omega_s$.

The augmented Mahalanobis distance between pixel i and the centroid of segment s is then the product:

$$D_i^T \Omega_s^{-1} D_i$$

Where the superscript$^T$ indicates matrix transposition, and the superscript$^{-1}$ indicates matrix inversion.

This distance measure is a scalar value, and pixels for which it is small are suitable candidates for membership of segment s.

As mentioned previously, two other factors are used in the segmentation: the number of pixels in the segment; and, the extent of the segment. The number of pixels is represented by $M_s$; and the extent can found from the augmented covariance matrix $\Omega_s$.

Segments for which $M_s$ is small are less favoured in the segmentation and this is achieved by adding a correction to the distance measure. This correction is given by:

$$L_s = -2 \times lg(M_s)$$

Where $L_s$ is the correction to be added to the distances from pixels to the centroid of segment s.

A measure of the extent of a segment is given by:

$$V_s = lg|\Omega_s|$$

Where $|\Omega_s|$ is the value of the determinant of the augmented covariance matrix $\Omega_s$; and,
  $V_s$ is the correction to be added to the distances from pixels to the centroid of segment s.

Note that the correction VS includes a contribution from the DFD variance $\sigma^2$, as well as contributions due to the spatial extent of the segment.

The corrected value for the distance between pixel i and the centroid of segment s is thus:

$$\Delta_{is} = D_i^T \Omega_s^{-1} D_i + L_s + V_s$$

This pixel distance value will be small when:
  The pixel has Cartesian co-ordinates which are close to the relevant centroid co-ordinates;
  The pixel's motion is well-matched to the relevant segment motion model;
  The relevant segment contains many pixels; and,
  The relevant segment has small spatial extent.

The final segmentation result is obtained by calculating the above distance measure twice for each pixel of the image: once for the "foreground" segment and once for the "background" segment. The results are made "probabilistic" by taking the negative exponential of half the distance measure and normalising, so that the total weight for each pixel is unity.

The probability $P_F(i)$ of pixel i being a member of the foreground segment is thus given by:

$$P_F(i) = [\exp(-\tfrac{1}{2}(\Delta_{iF}))] \div [\exp(-\tfrac{1}{2}(\Delta_{iF}) + \exp(-\tfrac{1}{2}(\Delta_{iB})]$$

Where the subscript$_F$ indicates the foreground segment, and the subscript$_B$ indicates the background segment.

Figure 5:
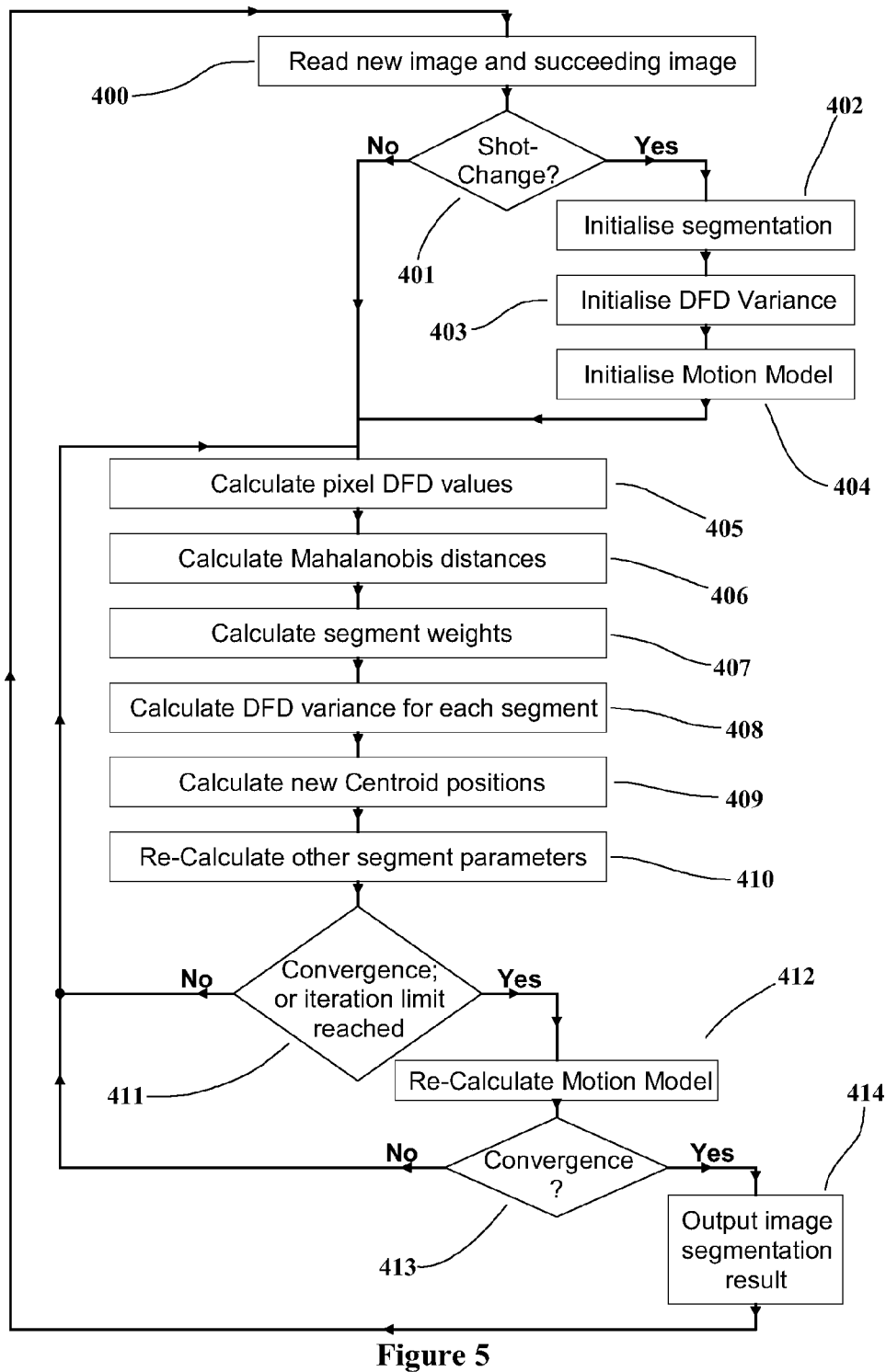
FIG. 5 shows a flowchart for refining segmentation parameters for an image segment.

An example of a segmentation process according to this principle is shown in FIG. 5. At step (400) a new image and its successor in the sequence of images are written into a store, or otherwise made available for processing. The images are compared to determine whether the succeeding image is a new shot (this could be the process (7) of FIG. 2) in step (401), and, if so, the segmentation process is initialised in steps (402), (403) and (404). These initialisation steps would also be performed when starting to process a new sequence of images.

Figure 6:
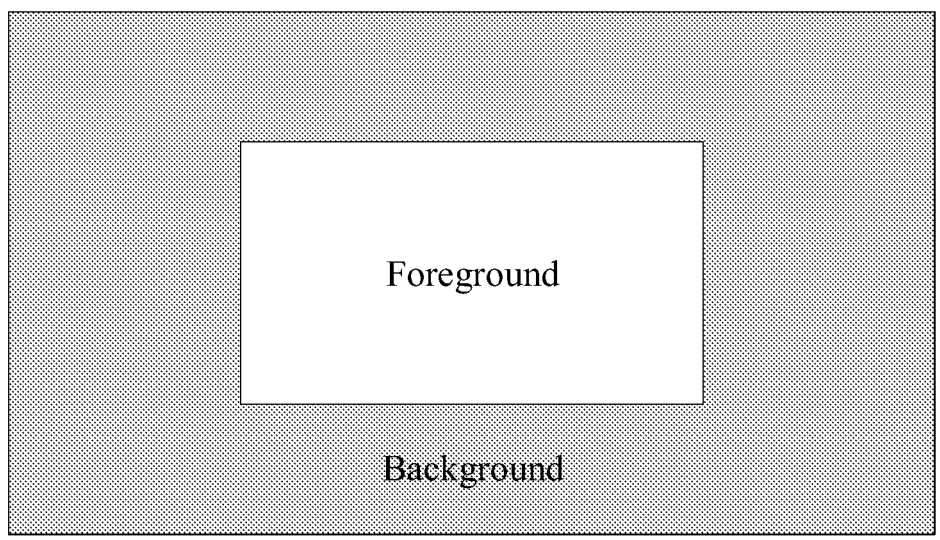
FIG. 6 shows an arbitrary initial segmentation of an image.

Step (402) makes an arbitrary segmentation in which a group of pixels in the centre of the image are given 100% probability of foreground membership, and the remaining pixels are given zero foreground probability (i.e. 100% background probability). This arbitrary segmentation will have a corresponding pair of centroid positions for the two segments and these values are also stored for subsequent use. A suitable arrangement is shown in FIG. 6, which shows how the central quarter of the image area could be assigned to the foreground. In this example both centroids are at the centre of the image.

Step (403) sets the DFD variance value $\sigma_2$ to an arbitrary high value (e.g. the largest number that the processor can conveniently represent) for both segments. Step (404) initialises both segment motion models by setting all the motion parameters to zero.

The DFD values for each pixel (two values per pixel, one for each segment) are calculated at step (405); this is the process shown in steps (31) to (33) of FIG. 4.

In step (406) the Mahalanobis distance of each pixel to each centroid is calculated; and, in step (407), both segment weights are calculated for each pixel from the Mahalanobis distances, $V_s$ and $L_s$ values. These segment weights are then used to calculate the weighted segment DFD variance values $\sigma^2$ in step (408). The new pixels weights and $\sigma^2$ values are then used to calculate revised centroid positions, in step (409), and new $V_s$ and $L_s$ values in step (410).

A test for "convergence" (411) is then made to see if a further iteration of the previous segmentation steps is needed. The test makes use of sum of the $\sigma^2$ values for the two segments; the current sum is compared with the previous sum obtained for the current image. The improvement due to the current iteration is indicated by the decrease in the value of the sum. If only a small improvement is measured (or if the iteration has made the result slightly worse) the process moves to step (412) and the motion model is refined as previously described with reference to FIG. 3; otherwise the processing returns to step (405). The test step (411) also includes a limit on the number of iterations; if this number is reached the processing moves to step (412).

If either convergence is found, or the specified maximum number of iterations has been reached, the motion model is refined in step (412). If convergence was found at step (411), a decision step (413) directs the processing to a segmentation output step (414) in which the current pixel segment weights are output and the processing returns to step (400) in order to segment the next image in the sequence.

Returning to FIG. 2, the set of foreground weights for the pixels of the image form a "key" signal identifying the area of interest, and this can be used to control the pre-processing filter block (14).

The results of the foreground/background segmentation process are also used to control the dynamic reframing and down-conversion block (10). This re-frames the picture in dependence upon the location of the centroid of the foreground segment; and, magnifies the picture in dependence upon the covariance matrix for the foreground segment, and the motion model for the background segment.

As has been described above, the area-of-interest definition block (11) calculates the covariance matrix $\Lambda_s$ for the two segments (foreground and background). Each matrix has two rows and two columns; the two leading diagonal matrix elements give, respectively, measures of the horizontal and vertical extent of the relevant segment. Such a matrix can be interpreted as an ellipse having the respective lengths of its major axes proportional to the two leading diagonal elements of the matrix. The remaining elements of the matrix give a measure of how well the major axes of the ellipse are aligned with the horizontal and vertical co-ordinate axes. The area of the ellipse gives a measure of the extent (in all directions) of the segment.

If the elements of the covariance matrix AF for the foreground segment are:

a b
c c

Then the area of the ellipse is $\sqrt{(a \cdot b + c^2)}$.

A suitable zoom factor can be derived from the diameter d of a circle having this area, i.e:

$$d = 2\sqrt{(\pi/A)}$$

Where $A = \sqrt{(a \cdot b + c^2)}$

The value of d should be normalised to lie in the range zero to unity by dividing by the square root of the image area (i.e. the square root of the total number of pixels making up the image). When d is small, the foreground area is small and it will be helpful to enlarge the picture (with the centre of enlargement located at the foreground centroid). Best subjective results have been obtained when the zoom factor is a non-linear function of d such as that shown in FIG. 7.

Figure 7:
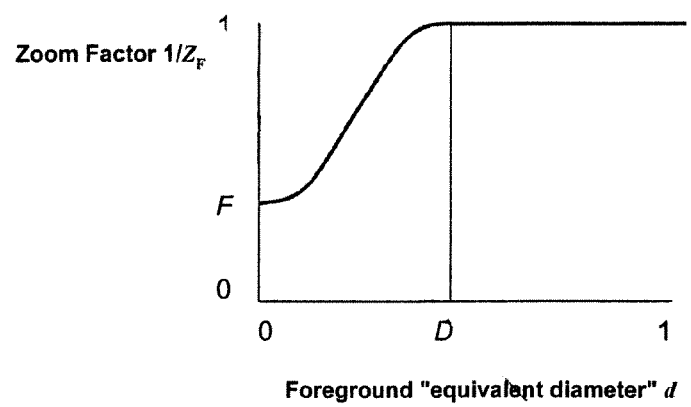
FIGS. 7 and 8 show graphs of non-linear functions for scaling image zoom factors.

FIG. 7 shows a graph of an inverse zoom factor $1/Z_F$ and the foreground "normalised equivalent diameter" measure d.

The equation for the curve shown in FIG. 7 is:

$$1/Z_F = \tfrac{1}{2}[(1 - \cos\pi \cdot (\min\{d/D, 1\})] \cdot [1 - F] + F$$

Where: $Z_F$ is the factor by which the image is enlarged; and,

F and D are parameters.

Where d is greater than or equal to D (which has the value 0.4 in the Figure) there is no zooming (i.e. $Z_F$ is unity). Where d is zero, a maximum zoom of 1/F is applied (F has the value ⅓ in the Figure and so the maximum zoom factor is three). For values of d between zero and D the zoom factor varies smoothly between three and unity.

It has also been found that a second zoom factor can be derived from the motion model for the background segment. Using the definitions of the motion model, equations (i) above, and evaluating the speed of motion v at the pixel co-ordinates X,Y the following equation can be obtained:

$$v = \sqrt{[(a_0 + a_1 \cdot X + a_2 \cdot Y)^2 + (a_3 + a_4 \cdot x + a_5 \cdot Y)^2]}$$

If we put X,Y equal to the co-ordinates of the centre of the image, v is equal to the equivalent speed of the background at the centre of the image. This speed value can be used to derive a zoom factor. When the value is large, the camera is probably tracking a moving foreground object and is therefore likely already to have zoomed into that foreground object; additional zoom is therefore inadvisable as important action may be lost. When the value is small, it is less likely that the camera has tightly framed the foreground; therefore the image can probably be zoomed so as to better appreciate the foreground object.

Figure 8:
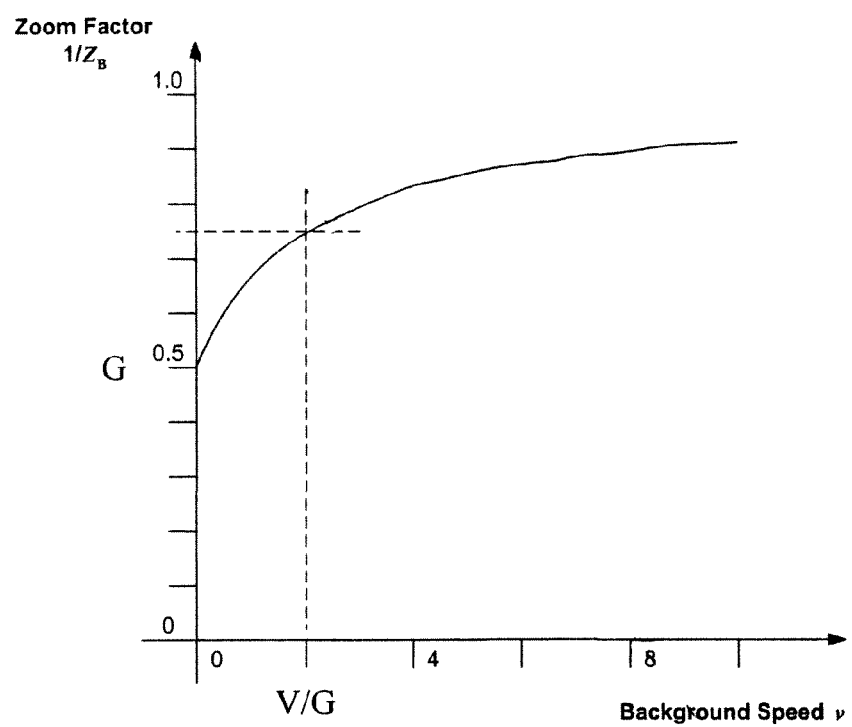

As in the case of the foreground-derived zoom factor a non-linear mapping between the measured parameter v and the zoom factor has been found to be subjectively pleasing. A suitable relationship is shown in FIG. 8. The equation for this curve is:

$$1/Z_B = (v + V) \div (v + V/G)$$

Where: $Z_B$ is the factor by which the image is enlarged; and,

V and G are parameters.

When the background speed v is zero the image is enlarged by 1/G. As the speed increases the zoom factor decreases asymptotically towards unity. The parameter V controls the rate of decrease. In the example shown in FIG. 8, V is unity and G is one half and so the zoom factor reduces to ⅔ at a background speed of two pixels per image.

The two zoom factors $1/Z_F$ and $1/Z_B$ are combined into a single factor to control the image magnification. An average of the two has been found satisfactory although some other weighted sum, or a minimum of the two could also be used. Although the foreground centroid could be used as the centre of magnification, it is safer to use a point half way between this centroid and the image centre as the centre of magnification.

There is another approach to the selection of the zoom factor and the centre of magnification which can be used as an alternative, or as a method of refining the result of the methods described above. A given combination of zoom factor and zoom centre defines a "reframing window" within which pixels are included in the reframed output picture and outside which pixels are lost. It is therefore possible to form a figure of merit for a particular window by taking a weighted sum of:
the sum of the foreground weights of the pixels within the window; and,
the sum of the background weights of the pixels outside the window.

A weighting of 3:1 in favour of the foreground sum has been found satisfactory. The size and position of the window can then be adjusted to maximise this figure of merit.

Both the centre co-ordinates and the zoom factor should be temporally filtered, for example by a 25-tap-running average filter, so as to smooth the reframing. It is also sometimes helpful to apply the zooming and reframing slightly in advance of the timing of the relevant video by delaying the video signal relative to the zoom parameters. In this way the arrival of important action can be anticipated.

As explained previously, the zooming and reframing process may need to be constrained to avoid moving important, fixed-position objects outside the transmitted area; this can be done by calculating the extremities of the reframed picture (i.e. the reframing window) from the zoom factor and zoom centre and comparing these with the known positions of objects that must not be excluded. Other methods, such as non-additively combining a key signal defining the reframed image with a key signal defining important areas, will be apparent to the skilled person.

Figure 9:
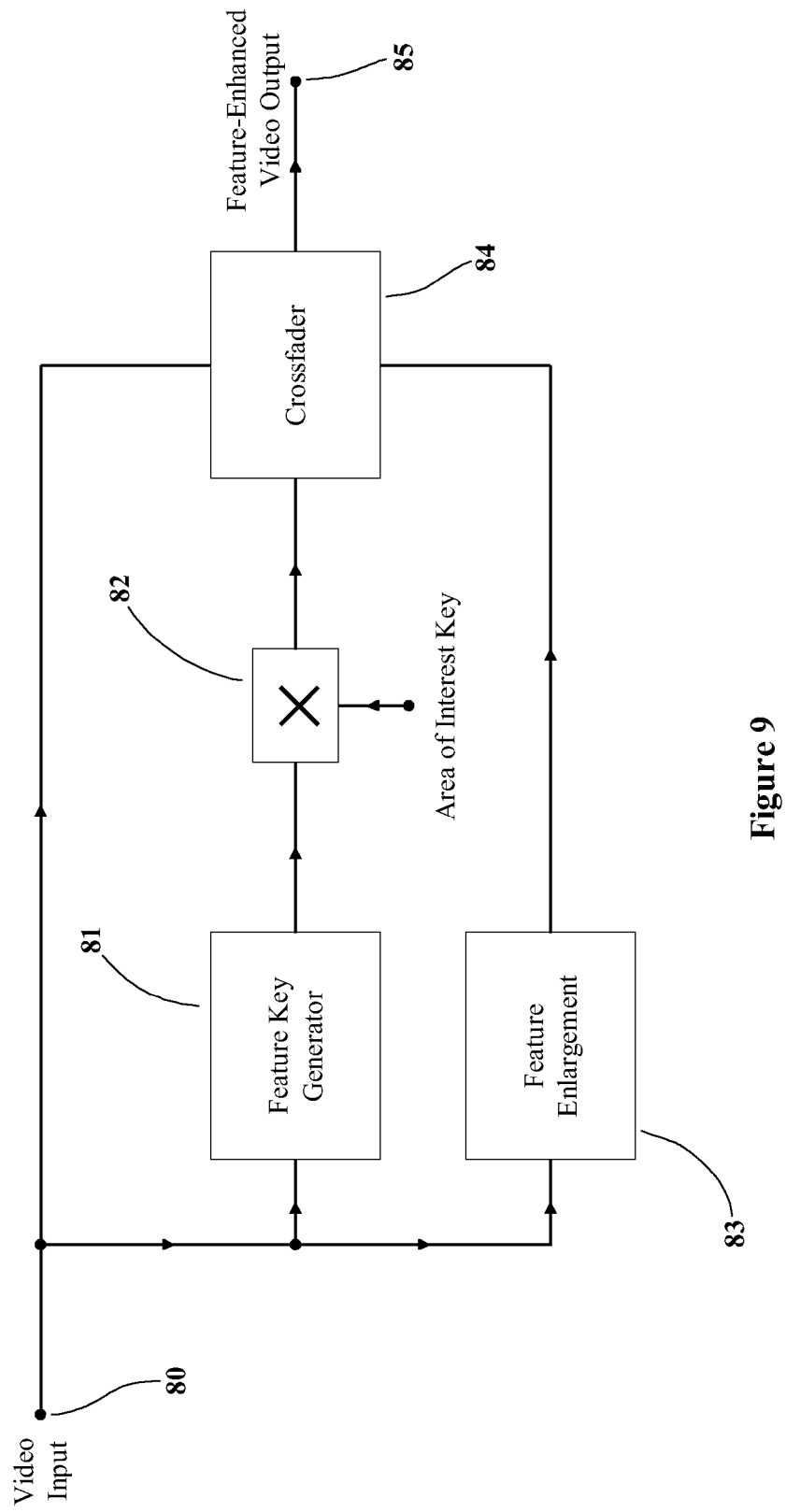
FIG. 9 shows a block diagram of a system for enhancing the visibility of features in an image sequence.

The operation of the feature enhancement block (9) of FIG. 2 is shown in FIG. 9. This block makes use of the fact that critical features in a scene can frequently be identified by their colour difference from a known background colour. For example balls and lines in sporting events played on grass can be identified as differences from the green colour of the grass.

Referring to FIG. 9, the input video signal (80) is analysed by a feature key generator (81) to produce a key signal which gives a measure of the colour difference between the current pixel and a reference colour. This key signal is small for pixels representing non critical areas and has a positive value for other pixels. The usefulness of this key can optionally be improved by multiplying it by the area of interest key signal (13) of FIG. 2, which represents the foreground weight of the current pixel obtained from the previously-described segmentation process. This multiplication is shown in FIG. 9 by the multiplier (82).

The input video signal (80) is also input to a feature enlargement block (83) which non-linearly processes the video so as to increase the spatial extent of areas which differ in colour from the reference colour. This is done by modifying a current pixel in dependence upon adjacent pixels when the colour of the current pixel differs from the reference colour; this will be described in more detail below.

A cross-fader (84) forms an enhanced video output (85) by fading from the input video (80) to the enhanced output from the feature enlargement block (83) when the key signal from feature key generator (81) (optionally modified by the multiplier (82)) is positive. In the output video signal (85) features having a colour difference from the reference are enlarged but the video is unchanged for areas close to the reference colour.

Typically the video signal (80) will be represented by a luminance value and two colour-difference values, if these values are denoted by Y, U and V a suitable output from the feature key generator (81) is:

$$\exp\{-[(Y-Y_{ref})^2/\sigma_Y^2+(U-U_{ref})^2/\sigma_U^2+(V-V_{ref})^2/\sigma_V^2]/2k\}$$

Where:
$Y_{ref} U_{ref} V_{ref}$ are the nominal pixel values for the reference colour;
$\sigma_Y \sigma_U \sigma_V$ are the standard deviations of reference colour pixels relative to the nominal values and,
k is a sensitivity parameter.
Nominal reference colour values and standard deviations can be obtained by analysing typical video material portraying the type of content which is to be enhanced.

A suitable implementation of the feature enlargement block (83) is a dilation process applied to one or more of the pixel luminance and colour-difference values. Typically all three are dilated. The current pixel value is replaced by the maximum value of the set of neighbouring pixels. For example, the luminance value is replaced by:

$$Y'_{x,y}=\max(Y_{i,j})$$

Where: $Y'_{x,y}$ the modified luminance value of the dilated pixel at co-ordinates x,y; and,
$Y_{i,j}$ is the set of nine luminance values of the nine pixels including and adjacent to the input pixel at co-ordinates x,y.

For this process to work properly it is necessary for the reference colour pixel value to be more negative than the pixel value of the features that are to be enhanced. This is usually the case for grass, as can be seen from the example reference values given above where both colour difference signals are more negative than the values for grey, and the luminance value is less than the middle of the coding range. This means that both luminance and colour difference values can be processed in the same way.

If a different reference colour is required to be used, or the objects to be enhanced have a colour with one or more low pixel values, the processing can be omitted for some colour components. For example if the reference colour has high colour difference signal values, only the luminance need be processed. Alternatively a linear transformation of the pixel colour space can be made so that the reference colour has low component values in the transformed space. This transformation must be applied at the input of the block (83) and an inverse linear transformation must be applied at the output of the block (83).

Figure 10:
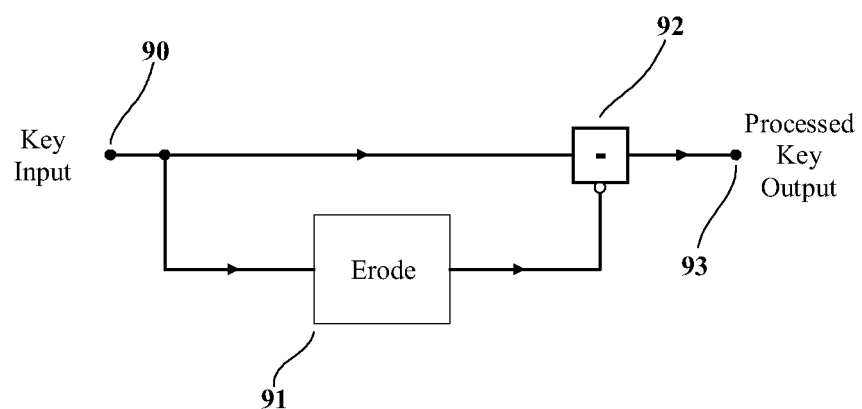
FIG. 10 shows a block diagram of the processing of a key signal.

The above-described dilation process, and the analogous "erosion" process in which the minimum of the set of adjacent pixel values is used, can be used to derive an improved enhancement key signal. An example is shown in FIG. 10. An input key signal (90) is eroded in an erosion block (91) and the eroded input key is subtracted from the uneroded signal in a subtractor (92). The output signal (93) from the subtractor will be active only in the narrow region outside the edges of objects to be enhanced. This will avoid unnecessary dilation in the reference-coloured parts of the picture which are remote from objects that are to be enhanced.

If the objects to be enhanced have a known colour, an alternative approach is for the reference colour in the key generation process to be set to this colour. The areas where the video is to be modified can be identified by dilating this key signal and subtracting the undilated key from the dilated key to give a key which is active in the region just outside the edges of objects which have the reference colour.

The output from the feature key generator (81) can also be used to improve the area of interest key signal (13). Where the reference colour is set to the known background colour the key output for a pixel from the key generator (81) gives an indication that the pixel is part of the background.

It has also been found that the pixel's saturation value in an HSL (hue, saturation and lightness) colour space is more likely to be high in the foreground. The HSL colour space is a double cone with one apex at white and the other at black. In this space the saturation value is the distance from the axis joining these apexes.

Taking account of these additional factors, the area of interest key I(i) for pixel i is given by:

$$I(i) = \alpha \cdot P_F(i) + \beta \cdot S(i) - \gamma \cdot K_B(i)$$

Where:
$P_F(i)$ is the foreground probability as described above;
$S(i)$ is the saturation;
$K_B(I)$ is the key value from the generator (81); and,
$\alpha$, $\beta$ and $\gamma$ are constants.

If the probability, saturation and key values are normalised to lie in the range zero to unity, suitable values for the constants are:
$\alpha = 2$
$\beta = 1$
$\gamma = 1$ The resulting value for I(i) can be clipped so as not to exceed unity and used as the area of interest key signal (13) in FIG. 2.

Figure 11:
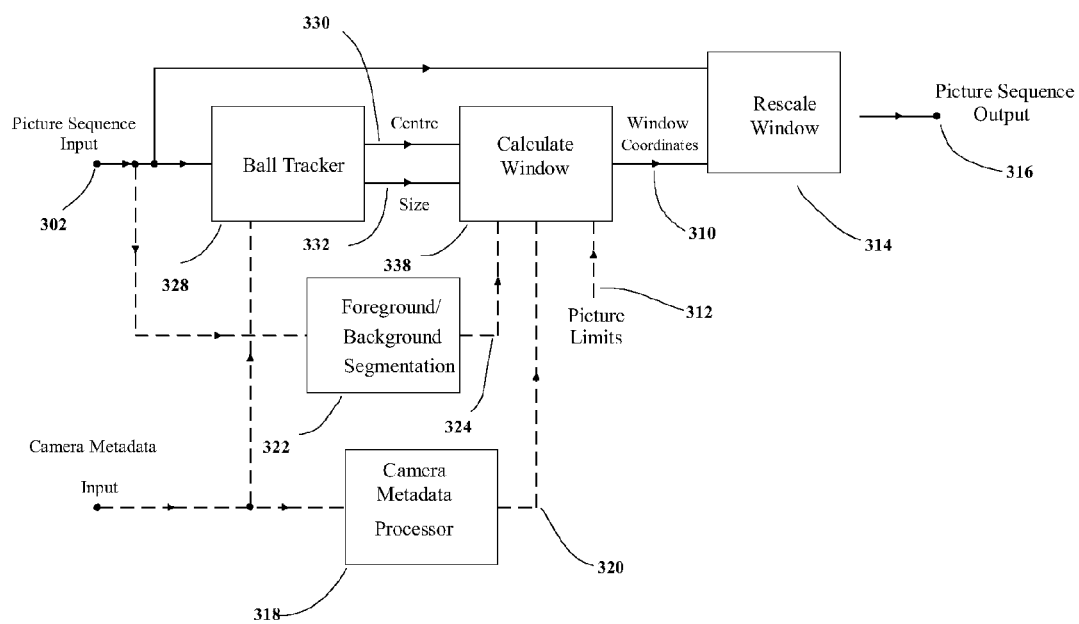
FIG. 11 shows a block diagram illustrating adaptive re-framing in accordance with a further embodiment.

Reference is now directed to FIG. 11.

FIG. 11 shows an arrangement that is particularly adapted to re-framing of pictures where the region of interest is likely to be centred on a particular object, which may move within the picture. This is particularly applicable to ball-based sports such as football or golf.

In this embodiment a ball tracker block 328 is provided, which analyses the input pictures and provides ball centre information 330 and ball size information 332 to the window calculation block 308. Various techniques for providing this information are known to a skilled person and so these techniques will not be described in any more detail.

The window calculation block 308 determines the window co-ordinates 310 based on the ball centre information 330 and ball size information 332, possibly in conjunction with region of interest information 320, 324 from the camera meta-data processor 318 and segmentation block 322 respectively.

In embodiments of the invention the window calculation block 308 determines the window co-ordinates 310 to ensure, so far as is possible, that the size of the ball in the picture is constant, and the ball is located within a predefined area of the output picture. Thus for example the output picture may generally be centred on the ball.

The remaining operation of this embodiment is the same as described above with reference to FIG. 1.

Additionally or alternatively additional processing of the picture may be carried out so as to alter the size and/or colour of part of the picture. In particular, in ball-based sports the ball may be made bigger and/or coloured a different colour or otherwise enhanced to increase its visibility. This technique enhances the contrast between the ball and the background action, enabling action to be followed more easily on a small screen. This technique also reduces the possibility that restrictions in the bit rate available to send the picture to the viewer, for example over a wireless link to a mobile phone, will result in the ball disappearing in the received picture.

Figure 12:
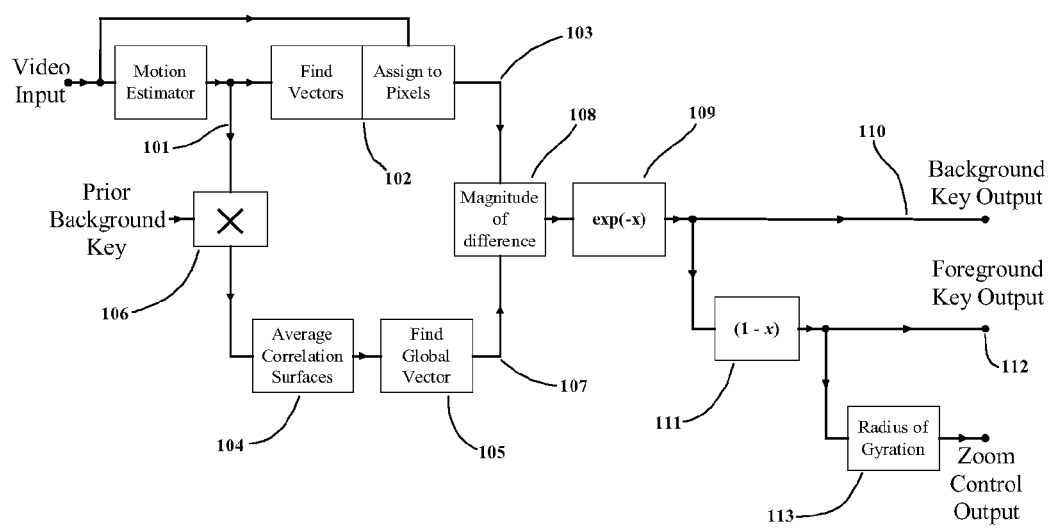
FIG. 12 shows a block diagram of a system for segmenting an image from a sequence of images and determining a zoom factor.
Figure 13:
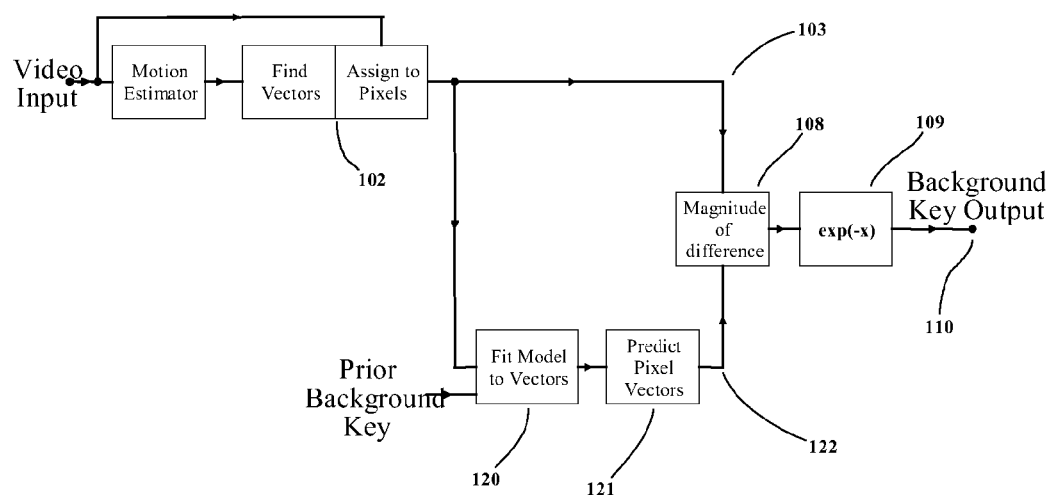
FIG. 13 shows a block diagram of a method of segmenting an image from a sequence of images by making use of a motion model.

Reference is now directed to FIGS. 12 and 13.

An example of an alternative method for deriving the area of interest key (13) and the control signals for the dynamic reframing process (10) will now be described. This method makes use of motion vectors from the motion estimator (3).

Preferably the motion estimator (3) divides the input video signal into blocks (typically 80 blocks in a 10×8 array) and performs a phase correlation process between each block and the corresponding block from an adjacent image in the sequence. The result of the process is a correlation surface for each block where the positions of peaks in the respective correlation surfaces indicate the values of motion vectors for objects portrayed within the respective block. This process is well-known in the art and will therefore not be described in detail.

FIG. 12 shows how the set of correlation surfaces (101) is used to determine the area of interest key and other reframing parameters. A vector determination and assignment block (102) calculates one or more motion vectors for each block and assigns a motion vector to each pixel of the block. This process is also well-known in the art and may make use of the input video signal, as shown in FIG. 12. The output of the vector assignment block (102) is a set of local motion vectors (103), one for each pixel of the current image.

The set of correlation surfaces (101) is also input to an averager (104) which computes an average correlation surface for the current image by averaging the surface heights of the individual block correlation surfaces. The resulting average surface is input to a global vector determination block (105) which locates the highest peak in the average correlation surface and converts the position of this peak into a global motion vector (107) for the current image.

If an existing segmentation of the image into foreground and background exists, the heights of the individual block correlation surfaces can, optionally, be weighted in a multiplier (106), which reduces the heights of those correlation surfaces which correspond to blocks known to be outside the background. The surface for each block is weighted according to a background weight for that block. Preferably the weighting factors lie in the range zero to unity and the weighting factor for a block is obtained by integrating the weights of the constituent pixels of the block over the area of the respective block.

The global vector (107) at the output of the global vector determination block (105) thus represents the average motion over the whole image; or, if background weighting is applied in the multiplier (106), the global vector (107) represents the average motion of the background.

Each pixel motion vector of the set of pixel motion vectors (103) is compared with the global motion vector (107) in a vector-difference calculation block (108). This computes the magnitude of the vector difference between each of the pixel motion vectors (103) and the global vector (107). This (scalar) difference value gives an indication of whether the current pixel is in the foreground. If the difference value is small foreground membership is unlikely; if the difference value is large foreground membership is likely. The comparison results from pixels at the edges of the picture should be ignored because otherwise objects entering or leaving the camera's field of view can be incorrectly classified as foreground objects. Similarly motion measurements across shot changes should be ignored.

The negative exponential of the difference value from the vector-difference calculation block (108) is determined in an exponentiator (109) to give a background membership probability measure. This result is used as a background key value (110) for the current pixel; and, it is subtracted from unity in a subtractor (111) to obtain a foreground key (112). Smoothly decreasing functions other than a negative exponential could be used in place of the exponentiator (109).

If the determination of the global vector (107) makes use of a previous segmentation result (i.e. background weighting is applied by the multiplier (106)), then the process may be iterated by applying the newly-determined background mask to the multiplier (106) and the segmentation re-calculated.

The foreground key (112) can be used as the area of interest key (13) in FIG. 2 and the centroid of this key can be used to control picture shifting as previously described.

Another way of finding a zoom control parameter from the foreground key (either the signal (112) of FIG. 12, or that determined by another segmentation technique) is to compute the radius of gyration of the foreground segment about its centroid. This is shown as the process (113) in FIG. 12.

If pixel i at co-ordinates x,y is at a distance $r_i$ from the foreground centroid, i.e:

$$r_i \sqrt{\{(x-\mu_x)^2 + (y-\mu_y)^2\}}$$

then the radius of gyration of the foreground segment $R_g$ is given by:

$$R_g^2 = \{\Sigma P_F(i) \cdot r_i^2\} \div M_F$$

Where
$P_F(i)$ is the foreground probability for pixel i;
$M_F$ is the total mass $\Sigma P_F(i)$ of the foreground segment; and,
the summation is over all the pixels of the image.

$R_g$ is equivalent to the radius of the previously-described circle having the same area as the ellipse derived from the foreground covariance matrix. Its value can be normalised and non-linearly mapped to a zoom control parameter in a similar way as described for the equivalent diameter d.

The global vector (107) may be obtained in other ways. For example, phase correlation between adjacent images in the sequence can be performed over the whole image (i.e. with one, large "block"), the position of the highest peak in the resulting correlation surface can then be used to calculate a global vector. Another method is to take all the pixel vectors (103) and average them to obtain a global vector.

Another way of using vector comparison to segment the images in a sequence is to make use of an affine (or other mathematical) motion model that describes the variation of the pixel motion vectors with their position. The model parameters are chosen to obtain the best fit between the modelled pixel motion vectors and the pixel motion vectors of whole image, or the pixel motion vectors of the background segment of the image. (In each case picture-edge regions are preferably excluded.)

An example of this method is shown in FIG. 13. Certain elements in this Figure are identical to corresponding elements in FIG. 12; where this is the case identical reference numerals are used.

Referring to FIG. 13, motion vectors are calculated and assigned (102) to the pixels of the current image to give a set of pixel motion vectors (103) and these form one input to a difference calculator (108). (These steps are identical to the corresponding steps in FIG. 12.)

The second input of the difference calculator (108) is fed with pixel motion vectors from a model (for example an affine model as described previously). These vectors are determined by a pixel motion prediction block (121) which makes use of model parameters from a model fitting block (120). The model fitting block (120) adjusts the parameters of the model so as to obtain a best fit between the modelled pixel motion vectors and the measured motion vectors (103). Optionally the assessment of the best fit can be confined to those pixels which have previously been identified as background pixels, by making use of a background key as shown by the prior background key input to the model fitting block (120).

The magnitude of the vector difference between the measured pixel motion vectors (103) and the predicted motion vectors (122) from the prediction block (121) is determined in the vector difference evaluation block (108) and a background key (110) is obtained by taking the negative exponential of the vector difference magnitude in the exponentiator (109). These steps are identical to the corresponding steps in the system of FIG. 12, and the background key (110) can be used to derive a foreground key and a zoom factor as described previously.

In a further variation a block-based model could be used in which the most significant vector from each block (i.e. that corresponding to the highest peak in the correlation surface for the block) is modelled.

The present invention has been described with reference to an uncompressed video signal. However, the invention may also be applied to a compressed or partially uncompressed video signal.

The present invention thus provides improved techniques for re-framing pictures.

The invention has been described herein by way of example and variations may be made to the described arrangements without departing from the scope of the invention. The invention encompasses methods and apparatus embodying the techniques described herein and may be implemented in hardware and/or software as will be apparent to a skilled person.

The invention claimed is:

1. A method of automatically reframing a moving image sequence, comprising the steps of deriving foreground and background segment weights for pixels in images in the sequence and framing each image, where the framing is adjusted in dependence upon the foreground and background segment weights.

2. A method according to claim 1 in which the reframed images are formed from only those input pixels which fall within a reframing window within the input image area and the position or size of the reframing window is adjusted so as to maximize a weighted total of the sum of the foreground weights of pixels within the window and the sum of the background weights of pixels outside the window.

3. A method of spatially segmenting a moving image sequence to determine respective foreground and background weights for image pixels, wherein previously assigned pixel weights are refined in dependence on: foreground and background motion models; foreground and background distance measures between pixels and respective foreground and background segment spatial positions.

4. A method according to claim 3 in which non integral pixel weights are determined.

5. A method according to claim 3 in which the said motion models are derived from, at least, pixel displaced-frame difference values where the said displaced-frame distance values are weighted according to previously-assigned foreground and background pixel weights.

6. A method according to claim 3 in which the segment comprising the greater number of pixels is favored in the determination of pixel weights.

7. A method according to claim 3 in which the segment of smaller extent is favored in the determination of pixel weights.

8. A method of automatically reframing a moving image sequence previously assigned pixel weights comprising the steps of enlarging one or more images in the sequence by a zoom factor; deriving a weighted measure of the position of foreground pixels in the image and centering the said enlargement upon a position in the image which depends upon a weighted measure of the position of foreground pixels in the image.

9. A method according to claim 1 in which a moving image sequence is automatically modified to make it more suitable for viewing on a small display device, comprising the steps of segmenting an image into foreground and background regions, with no predetermined constraint on the shape of the foreground region; and fitting a rectangular frame to the segmented image so as maximize the amount of foreground contained within the frame whilst minimizing the amount of background contained within the frame, with no predetermined constraint on the size of the rectangular frame.

10. A method according to claim 9, wherein the step of segmenting the image into foreground and background regions comprises the step of assigning to each pixel or picture block a foreground weight and a background weight representing the estimated probability that the pixel or picture block forms part of foreground and background respectively; and wherein the step of fitting a rectangular frame to the segmented image serves to as maximize the aggregate foreground weight whilst minimizing the aggregate background weight of pixels or picture blocks contained within the frame.

11. A method of re-framing a picture comprising the steps of:
identifying a target;
identifying at least one of the size and/or shape of the target;
determining the size or shape of a region of interest, or both, dependent on the size or shape, or both, of the target, wherein the region of interest is determined based on a measure of confidence or probability that a picture element or region belongs to the region of interest; and re-sizing the selected region of interest.

12. A method according to claim 8 wherein the zoom factor depends on a weighted summation of a distance measure between the positions of foreground pixels and the position of the foreground centroid and the image is increasingly enlarged as the weighted summation reduces.

13. A method according to claim 12 in which the zoom factor depends on $$(a \cdot b + c^2)$$

Where:
a is the weighted variance of the differences between foreground pixels' horizontal co-ordinates and the foreground centroid's horizontal co-ordinate;
b is the weighted variance of the differences between foreground pixels' vertical co-ordinates and the foreground centroid's vertical co-ordinate; and,
c is the weighted covariance between the said horizontal and vertical co-ordinate differences.

14. A method of automatically reframing a moving image sequence comprising:
enlarging one or more images in the sequence by a zoom factor,
wherein the zoom factor depends on a measure of the speed of motion of background pixels, and the image is increasingly enlarged as speed of motion decreases,
wherein the zoom factor depends upon evaluation of the equivalent background speed at the center of the image.

15. A method of automatically reframing a moving image sequence comprising:
enlarging one or more images in the sequence by a zoom factor,
wherein the zoom factor depends on a measure of the speed of motion of background pixels, and the image is increasingly enlarged as speed of motion decreases,
wherein the equivalent background speed at the center of the image is derived from a model of the motion of background pixels.

16. A method of automatically reframing a moving image sequence comprising the steps of deriving a measure of the spatial extent of a foreground segment; deriving a measure of the motion of a background segment; and enlarging one or more images in the sequence by a zoom factor wherein the zoom factor depends on a combination of the a measure of the spatial extent of a foreground segment and the measure of the motion of a background segment.

17. A method of reframing according to claim 1 in which a reframing parameter is temporally filtered before being applied to an image.

18. A method of reframing according to claim 1 in which an image is reframed in dependence upon the content of a later image in the sequence.

19. A method of re-purposing a video signal comprising the steps of: re-framing the pictures of the video signal as claimed in claim 1; and compression coding the resulting picture.

20. A method according to claim 3 in which the said foreground and background segment positions are the respective segment centroid positions.

21. A method according to claim 3 in which the said motion models are derived from, at least, pixel-value gradients and the said gradients are weighted according to previously-assigned foreground and background pixel weights.

* * * * *